United States Patent
Bikumala et al.

(10) Patent No.: US 11,625,361 B2
(45) Date of Patent: Apr. 11, 2023

(54) AUTOMATED FILE NAMING AND FILE ORGANIZATION USING MACHINE LEARNING

(71) Applicant: Dell Products L. P., Round Rock, TX (US)

(72) Inventors: Sathish Kumar Bikumala, Round Rock, TX (US); Ares Sakamoto, Lexington, TX (US); Deepak NagarajeGowda, Cary, NC (US)

(73) Assignee: Dell Products L.P., Round Rock, TX (US)

(*) Notice: Subject to any disclaimer, the term of this patent is extended or adjusted under 35 U.S.C. 154(b) by 394 days.

(21) Appl. No.: 16/855,428

(22) Filed: Apr. 22, 2020

(65) Prior Publication Data

US 2021/0334238 A1    Oct. 28, 2021

(51) Int. Cl.
G06F 16/00     (2019.01)
G06F 16/16     (2019.01)
G06N 20/00     (2019.01)
G06F 16/13     (2019.01)

(52) U.S. Cl.
CPC ............ G06F 16/164 (2019.01); G06F 16/13 (2019.01); G06N 20/00 (2019.01)

(58) Field of Classification Search
None
See application file for complete search history.

(56) References Cited

U.S. PATENT DOCUMENTS 9,483,532 B1 * 11/2016 Zhang ............... G06F 16/24553
10,884,979 B2 * 1/2021 Paterson ................ G06F 16/13
2015/0039610 A1 * 2/2015 Hubauer ........... G06F 16/24553
                                                        707/774
2015/0039618 A1 * 2/2015 Gates ................... G06F 16/951
                                                        707/738
2018/0067957 A1 * 3/2018 Paterson ............... G06F 16/185
2019/0370365 A1 * 12/2019 Chalakov ............ G06F 16/2365
2020/0034447 A1 * 1/2020 Lapointe ................ G06N 20/00

OTHER PUBLICATIONS

Lee et al., "Automatic folder allocation system using Bayesian-support vector machines hybrid classification approach", (Year: 2012).*
Latent Dirichlet Allocation: Extracting Topics from Software Engineering Data, Campbell et al., (hereinafter "Campbell"), pp. 139-159 (Year: 2015).*
FLDA-matrix factorization through latent dirichlet allocation, Agawal et al.,, ACM, pp. 91-100 (Year: 2010).*

* cited by examiner

*Primary Examiner* — Jean M Corrielus
(74) *Attorney, Agent, or Firm* — Krishnendu Gupta Deepika Bhayana; Lesley A. Leonessa

(57) ABSTRACT

In some examples, before saving a file, a device analyzes contents (e.g., text and images) of the file to create a bag of words. The device performs Latent Dirichlet Allocation of the bag of words to determine topics included in the file and orders the topics in descending order of frequency. The device generates a particular name of the file based on the ordered topics and automatically save (or suggest saving) the file with the particular name. The device determines, based on the ordered topics, a folder name of a folder in which to store the file. If an existing folder has the folder name, then the device saves the file in the existing folder. If not, then the device creates a new folder with the folder name and saves the file in the new folder.

17 Claims, 7 Drawing Sheets

US 11,625,361 B2

AUTOMATED FILE NAMING AND FILE ORGANIZATION USING MACHINE LEARNING

BACKGROUND OF THE INVENTION

Field of the Invention

This invention relates generally to using machine learning to manage files and more particularly to using machine learning to name a file and, in some cases, to determine in which folder to store the file.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A user in a corporation (e.g., an Enterprise) may acquire the same file from multiple sources. For example, the user may receive the same file via email from multiple sources and may download the same file from one or more locations. Often, the user may unknowingly save the same file to more than one location on the user's computer. Part of the reason for saving the same file in multiple locations may be because of a lack of organization of files and file folders on the user's computer.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

As an example, a device may determine that a file is to be saved and perform an analysis of contents (e.g., text and images) of the file to create a bag of words. For example, the computing device may perform a first analysis of the text to create a first bag of words, determine the images in the file, perform a second analysis of the images to create a second bag of words, and combine the first bag of words and the second bag of words to create the bag of words. The device may perform a Latent Dirichlet Allocation of the bag of words to determine topics included in the file. The topics may be ordered in descending order of frequency of each of the topics to create an ordered set of topics. The device may generate a particular name of the file based on the ordered set of topics and automatically save (or suggest saving) the file with the particular name. The device may determine, based on the ordered set of topics, a folder name of a folder in which to store the file. If an existing folder has the folder name, then the device may save the file in the existing folder. For example, the particular folder may include one or more additional files, with individual files of the one or more additional files including at least one topic of the plurality of topics. If the set of accessible folders does not include a particular folder with the folder name, then the device may create a new folder with the folder name and save the file in the new folder. For example, the folder name may include at least one topic of the plurality of topics.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
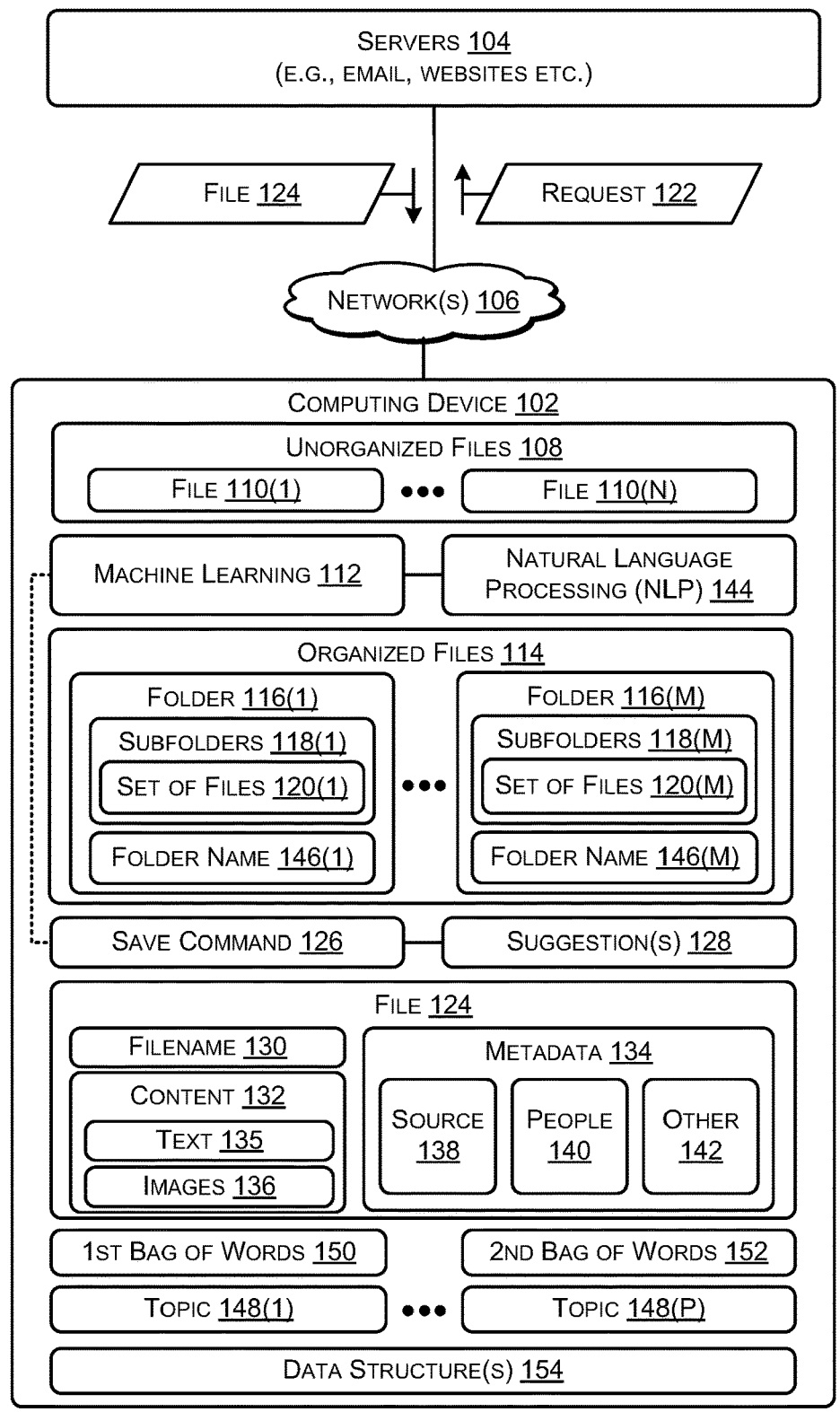
FIG. 1 is a block diagram of a system in which machine learning is used to manage files, according to some embodiments.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein use machine learning (e.g., LDA) to provide automated file management to a computing device, such as an information handling system. For example, when a user downloads a file, the systems and techniques may analyze the file to determine topics discussed in the file and suggest a filename based on the topics. In some cases, the suggested file name may be automatically selected and used as the file name to store the file on the computing device. In other cases, the systems and techniques may provide a user interface, such as a drop-down menu, with one or more suggested file names derived based on the topics discussed in the file and the user may select and save the file, using the user interface, with a particular file name of the suggested file names. As another example, a user may specify a directory, and the systems and techniques may analyze the files in the directory, determine topics discussed in each of the files in the directory, create subfolders based on the topics, and place one or more of the files in each subfolder to organize the files in the directory.

As an example, a computing device may include one or more processors and one or more non-transitory computer readable media to store instructions executable by the one or more processors to perform various operations. For example, the operations may include determining that a file is to be saved to the computing device. The operations may include performing an analysis of a contents of the file to create a bag of words. For example, the operations may include determining text included in the file, performing a first analysis of the text to create a first bag of words, determining one or more images in the file, performing a second analysis of the one or more images to create a second bag of words, and combining the first bag of words and the second bag of words to create the bag of words. Performing the first analysis may include: segmenting the text into one or more sentences, determining a plurality of tokens in each of the one or more sentences, performing lemmatization of each token of the plurality of tokens, removing stop words from the plurality of tokens to creating remaining tokens, determining a part of speech for each token in the remaining tokens, creating a data structure representing the remaining tokens in each of the one or more sentences, and determining the plurality of topics based at least in part on the data structure representing the remaining tokens in each of the one or more sentences. Performing the second analysis may include: determining one or more regions in individual images of the one or more images, where individual regions of the one or more regions includes at least one object, determining a text-based description to describe the at least one object in individual regions, and storing the text-based description of individual regions in the individual images in the second bag of words. The operations may include performing a Latent Dirichlet Allocation of the bag of words. The operations may include determining, based on the Latent Dirichlet Allocation, a plurality of topics included in the file. The operations may include ordering the plurality of topics in a descending order of a frequency of individual topics to create an ordered set of topics. The operations may include generating a particular name of the file based on the ordered set of topics. The operations may include automatically saving the file with the particular name. The operations may include determining, based on the ordered set of topics, a folder name of a folder in which to store the file. Based on determining that an existing folder among a set of accessible folders has the folder name, the operations may include saving the file in the existing folder. For example, the file with the particular name may be saved in a particular folder having a particular folder name, where the particular folder name includes at least one topic of the plurality of topics. As another example, the particular folder may include one or more additional files, with individual files of the one or more additional files including at least one topic of the plurality of topics. Based on determining that the set of accessible folders does not include a particular folder with the folder name, the operations may include creating a new folder with the folder name and saving the file in the new folder.

FIG. 1 is a block diagram of a system 100 in which machine learning is used to manage files, according to some embodiments. In the system 100, a representative computing device 102 may be connected to multiple servers 104 via one or more networks 106. The servers 104 may host, for example, an email server, intranet websites (e.g., internal to a company), Internet websites (e.g., external to the company), and the like.

The computing device 102 may be a smart phone, a tablet, a laptop, a desktop, or another type of computing device (e.g., information handling system). The computing device 102 may include unorganized files 108, such as a file 110(1) to a file 110(N) (N>0). For example, the unorganized files 108 may be located in a particular location, such as, for example, a desktop of the computing device, a documents folder of the computing device, or another location on the computing device 102. The unorganized files 102 may include documents (e.g., files having a file type of .doc, .docx, .ppt, .pptx, .pdf, xls, .xlsx, or the like), photographs (e.g., files having a file type of .jpg, .jpeg, .png, .raw, .tiff, or the like), videos (e.g., files having a file type of .mpg, .mpeg, .mp4, .mkv, .qt, or the like), folders, another type of file, or any combination thereof. Note that a video is a series of photographs taken at a predetermined time interval, such as every 30 seconds, every 60 seconds, or the like.

Machine learning 112 may implement one or more machine learning algorithms that works in conjunction with natural language processing (NLP) 142 to identify images in a document, identify regions in each image, determine a description of each region, determine a name for a document, to determine a name of a folder in which to place the document, and other similar functions. For example, the machine learning 112 may use Latent Dirichlet Allocation (LDA), artificial neural networks (ANN), and other types of machine learning. A user of the computing device 102 may use the machine learning 112 to analyze the unorganized files 108 and output organized files 114.

The organized files 114 may include multiple folders 116(1) to 116(M), with each folder having a corresponding folder name 146(1) to 146(M), respectively (M>0). Each of the folders 116 may include zero or more subfolders 118. For example, the folder 116(1) may include a subfolder 118(1) and the folder 116(M) may include a subfolder 118(M). Each of the subfolders 118 may include a set of (e.g. one or more) files. For example, the subfolder 118(1) may include a set of files 120(1) and the subfolder 118(M) may include a set of files 120(M). The machine learning 112 may analyze the unorganized files 108 to identify one or more topics included in each of the files 108. The machine learning 112 may order the topics based on a frequency with which words associated with each topic occur. For example, if X number of words in a file reference a first particular topic and Y number of words (X>0, Y>0, X>Y) in a file reference a second particular topic, then the first particular topic may be ordered ahead of the second particular topic. Based on the topics identified in each of the files 108, the machine learning 112 may create a hierarchical structure of folders and subfolders for the organized files 114. Each of the folder names 146 may be determined based on the topics identified as being included in each of the files 110. The set of files 120 may be grouped into a particular subfolder 118 based on each file in the set of files 120 sharing one or more topics. Thus, the machine learning 112 may create the folder names 146 and place the set of files 120 in each of the subfolders 118 based on the topics included in each of the files 110. Files that share one or more topics may be placed together in a folder or subfolder.

The machine learning 112 may work in conjunction with a save command 126. For example, the user may use the computing device 102 to send a request 122 to a particular server of the servers 104. In response, the particular server of the servers 104 may provide access to a file 124 to the computing device 102. For example, the file 124 may be sent to or downloaded by the computing device 102. After the file 124 is available to be saved on the feuding device 102, the save command 126 may use the machine learning 112 to analyze the file 124. The machine learning 112 may provide one or more suggestions 128. The suggestions 128 may include a filename 130 to name the file 124. The suggestions 128 may include one of the folder names 146 in which to save (e.g., store) the file 124. In some cases (e.g., depending on a user-specified option), rather than provide the suggestions 128, the save command 126 may automatically (e.g., without human interaction) name the file 124 using the filename 130 and place the file 124 in a particular one of the folders 116 based on the corresponding folder name 146.

The machine learning 112 may analyze each of the files 110 similar to the way the machine learning 112 may analyze the file 124. For example, the machine learning 112 may analyze the file 124 that includes content 132 and metadata 134. The machine learning 112 may determine whether the content 132 of the file 124 includes images 136 and analyze the images 136 in addition to the content 132. The machine learning 112 may analyze the metadata 134 including, for example, a source 138, people 140, and other data 142. The source 138 may indicate a source of the file 124, such as whether the file 124 was included in an email, downloaded from a particular website, and other source related information. The people 140 associated with the file 124 may include, for example, an author of the file 124, a sender of the file 124, a sender of an email that includes the file 124, other recipients of the email that includes the file 124, and the like. The other data 142 may include a date when the file 124 was created, a date when the file 124 was downloaded, a date when the file 124 was last modified, and other file related information. The machine learning 112 may analyze the content 132, including the images 136 and the metadata 134 to determine topics 148(1) to 148(P) associated with the file 124. For example, the machine learning 112 may analyze (i) text 135 included in the content 132 and (ii) the metadata 134 to create a first bag of words 150. The machine learning 112 may analyze zero or more images 136 included in the file 124 to create a second bag of words 152. The machine learning 112 may analyze the first bag of words 150 and the second bag of words 152 to determine topics 148(1) to 149(P) (P>0) discussed in the file 124. A bag of words is a text-based representation that disregards grammar and word order but includes the occurrence of words. Thus, the bag of words 150, 152 are each a representation of text that describes the occurrence of each word within a document.

The machine learning 112 may analyze the bag of words 150, 152 to create data structures 154 (e.g., a hierarchical structure). Each of the data structures 154 may represent a particular sentence. For example, a particular data structure of the data structures 154 may include parts of speech (e.g., noun, verb, and the like) at a first level and include qualifiers (e.g., adjective that modifies a non, adverb that modifies a verb, and the like) at a second level that is lower than the first level. The machine learning 112 may use the data structures 154 to determine the topics 148.

Based on the topics 148, the machine learning 112 may determine which particular folder of the folders 116 (including the subfolders 118) in which to place the file 124. For example, the machine learning 112 may store the file 124 in a particular subfolder of the subfolders 118 based on determining that the file 124 has one or more of the topics 148 in common with the set of files 120 stored in the particular subfolder. As another example, the machine learning 112 may store the file 124 in a particular folder of the folders 116 (including subfolders 118) based on determining that the file 124 has one or more of the topics 148 in common with a folder name of the particular folder.

Based on the topics 148, the machine learning 112 may create a filename 130 and save the file 124 on the computing device 102 using the filename 130. If a suitably named folder is not available, in some cases, the save command 126 may automatically (e.g., without human interaction) create a new folder with a name (e.g., based on the topics 148) and automatically save the file 124 in the new folder. In other cases, the save command 126 may provide, in the suggestions 128, one or more filename suggestions for the file 124 and one or more folder name suggestions for a folder in which to place the file 124. Whether the file 124 is automatically named by the machine learning 112 or whether a user names the file 124 based on the suggestions 128 made be determined based on enabling or disabling options (e.g., automatic file naming option, automatic folder naming option, automatic save option) in a user profile.

Thus, the machine learning may determine topics included in a file based on analyzing, using machine learning, a content (e.g. text and images) of the file. The machine learning may order the topics based on how many words are used to reference a particular topic. Based on the order of the topics, the machine learning may create or suggest a filename for a file when the file is to be saved on a computing device. For example, a user may receive the file via a message, such as an email, or the user may download the file from an internal site or an external site. Based on the order of the topics, the machine learning may determine a particular name to associate with the file and either automatically save the file with the particular name or suggest that the file be saved with the particular name. The machine learning may determine a particular folder name in which to save the file and either (1) suggest or automatically create a new folder with the particular folder name if the folder with the particular folder name does not exist or (2) suggest or automatically save the file in the particular folder name if the folder with the particular folder name exists. In addition, the user may specify a top-level folder (e.g., desktop, documents folder, or the like) to organize and the machine learning may recursively analyze each file contained in the top-level folder and lower-level folders, create appropriately named folders based on the topics included in each of the files, and move each file into a particular folder (or subfolder) based on the topics included in each file. In this way, files having one or more topics in common may be placed in the same folder (or subfolder) and the name of the folder in which the files are placed may include one or more of the topics that the files have in common.

Figure 2:
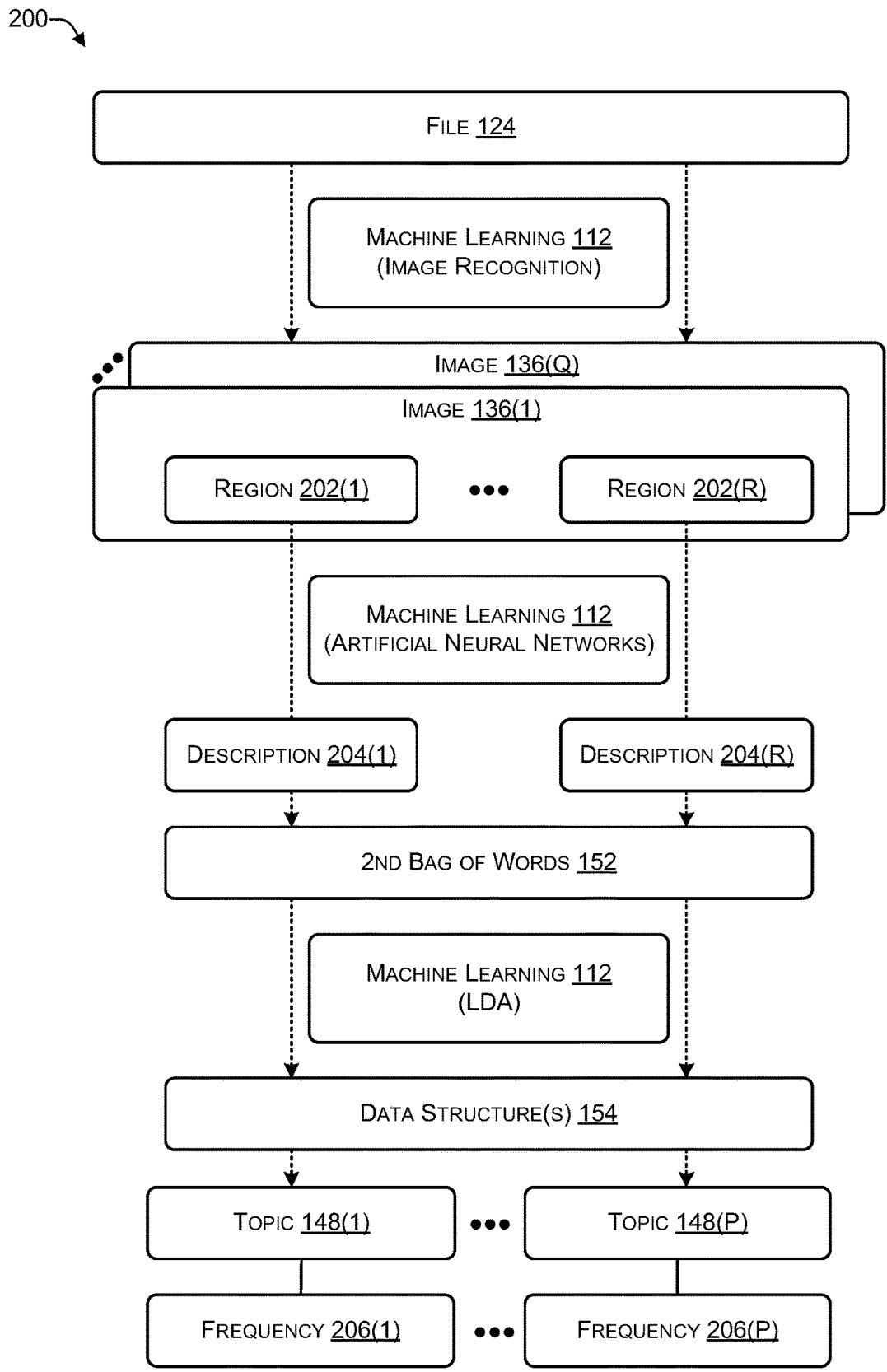
FIG. 2 is a block diagram of a system in which machine learning is used to create a bag of words from images in a file, according to some embodiments.

FIG. 2 is a block diagram of a system 200 in which machine learning is used to create a bag of words from images in a file, according to some embodiments. The system 200 illustrates how the images 136 may be analyzed to identify the topics 148.

The machine learning 112 may extract the images 136(1) to 136(Q) (Q>=0) from the file 124. The machine learning 112 may identify one or more regions 202 in each of the images 136. For example, the machine learning 112 may identify a region 202(1) to a region 202(R) (R>0) in the image 136(1). The machine learning 112 may use, for example, an artificial neural network (ANN) or other type of machine learning algorithm to identify each of the regions 202 in a particular image such as the image 136(1).

The machine learning 112 may analyze each region 202 (e.g., using ANN) and create a text-based description 204 to describe the region using one or more words. In this way, the machine learning 112 may create a description 204(1) corresponding to the region 202(1) and a description 204(R) corresponding to the region 202(R). For example, an image of a meal at a restaurant may be subdivided into multiple regions, with a first region including a glass partially filled with a liquid, a second region including a plate with one or more food items, a third region including cutlery, a fourth region including a menu and so on. The machine learning 112 may create a text description for the one or more objects in each region, such as, for example, "drink" for the first region, "meal that includes a sandwich" for the second region, "cutlery" for the third region, "menu" for the fourth region, and so on.

The descriptions 204 may be included in the second bag of words 152 that is associated with the images 136. The machine learning 112 may use a second type of machine learning algorithm 112 (e.g., LDA) to analyze a second bag of words 152 to create the data structures 154. The machine learning algorithm 112 may analyze the data structures 154 (e.g., each data structure may represent a sentence) to determine the topics 148. The machine learning 112 may determine a frequency 206 associated with each topic 148 that indicates how frequently each of the topics 148 is discussed in the file 124. For example, the machine learning 112 may determine the frequency 206(1) associated with the topic 148(1) to the frequency 206(P) associated with the topic 148(P). The machine learning 112 may reorder the topics 148 in descending order of frequency 206, with a first topic having a first frequency placed before a second topic having a second frequency, where the second frequency is less than the first frequency.

In the flow diagrams of FIGS. 3, 4, 5, and 6, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 200, 300, 400, 500, and 600 are described with reference to FIG. 1 and FIG. 2, as described above, although other models, frameworks, systems and environments may be used to implement these processes.

Figure 3:
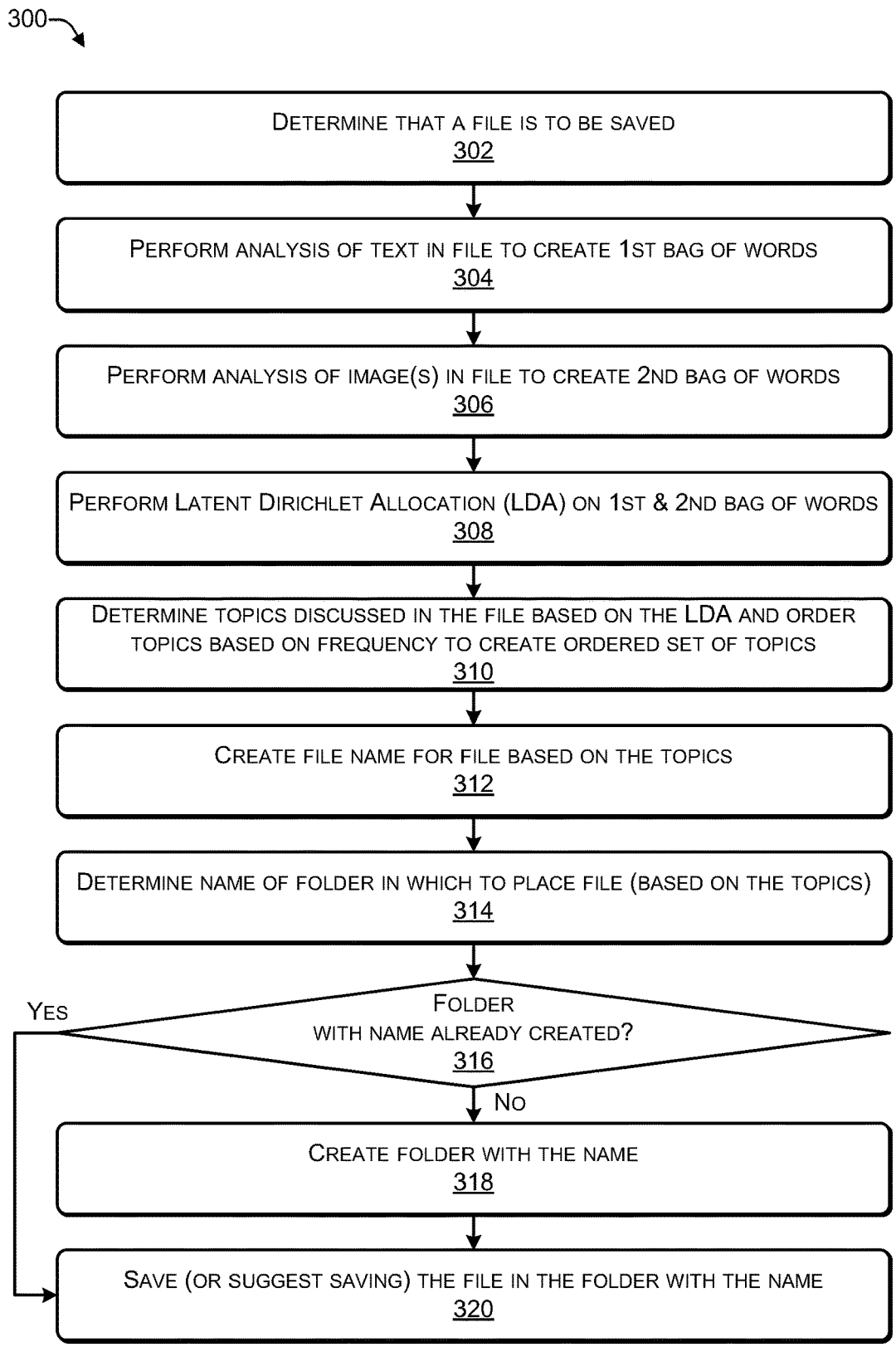
FIG. 3 is a flowchart of a process that includes determining, using machine learning, a name of a folder in which to place a file, according to some embodiments.

FIG. 3 is a flowchart of a process 300 that includes determining, using machine learning, a name of a folder in which to place a file, according to some embodiments. The process 300 may be performed by software components, such as, for example, the machine learning 112, the natural language processing 144, the save command 126, and the suggestions 128, of the computing device 102.

At 302, the process may determine that a file is to be saved. At 304, the process may perform an analysis of text in the file to create a first bag of words. At 306, the process may perform an analysis of zero or more images in the file to create a second bag of words. For example, in FIG. 1, the machine learning 112 may perform an analysis of the file 124 or one of the files 110. To illustrate, the machine learning may analyze the text 135 and the metadata 134 to create the first bag of words 140 (e.g., this process is described in more detail in FIG. 2) and analyze the images 136 to create the second bag of words 152 (e.g., this process is described in more detail in FIG. 3).

At 308, the process may perform Latent Dirichlet Allocation (LDA) (or a similar technique) on the first and second bag of words. At 310, the process may determine topics discussed in the file based on performing the LDA and order the topics based on frequency to create an ordered set of topics. For example, in FIG. 1, the machine learning 112 may analyze the first bag of words 150 and the second bag of words 152 to determine the topics 148, determining a frequency of each of the topics 148 in the file 124 and order the topics in descending order of frequency (e.g., a first topic with a first frequency has a place in the order before a second topic with a second frequency that is less than the first frequency).

At 312, the process may create a filename for the file based on the topics. At 314, the process may determine, based on the topics, a particular name of a folder in which to place the file. At 316, the process may determine whether the folder with the particular name exists (e.g., has already been created). If the process determines, at 316, that "no" the folder with the particular name does not exist (e.g., has not been created), then the process may create a folder with the particular name, at 318, and proceed to 320. If the process determines, at 316 that "yes" the folder with the particular name exists (e.g., has already been created), then the process may proceed to 320. At 320, the process may save (or suggest saving) the file in the folder with the name. For example, in FIG. 1, the machine learning 112 may determine the filename 130 based on the topics 148 (e.g., in descending order of number of occurrences) identified in the file 124. The machine learning 112 may determine a name of a folder (or subfolder) into which the file 124 is to be stored based on the topics 148. For example, the machine learning 112 may determine which of the folder names 146 include one or more of the topics 148. The machine learning 112 may determine that the folder 116 (or the subfolder 118) that includes a highest number of the topics 148 associated with the file is to be the particular folder in which to store the file 124. The machine learning 112 may automatically store the file 124 in the particular folder or suggest in the suggestions 128 that the file 124 be stored in the particular folder of the folders 116 (or the subfolders 118).

If the folder names 146 do not include any (e.g., exclude all) of the topics 148, then the machine learning 112 may automatically create (or suggest creating) a new folder with a corresponding name that includes one or more of the topics 148 and automatically store (or suggest storing) the file 124 in the new folder.

Thus, when a file is received or retrieved, a machine learning algorithm on a computing device may analyze the contents of the file, including text, images, and metadata included in the file to determine one or more topics discussed in the file. The machine learning may use the topics to create a suitable filename for the file. The machine learning may use the topics to determine a name of a folder in which to save the file. For example, the name of the folder may include at least one of the topics. If such a folder does not exist, the machine learning may create, or suggest creating, a folder with a particular name determined based on the topics and placing the file in the folder. This process of naming a file and identifying or creating a folder in which to store the file may be automatic or may be suggested, depending on user-specified options. In this way, duplicate files can be avoided because the machine learning suggests the same name for the same file, regardless of whether the file is received via email from multiple senders or downloaded from multiple sites. For example, if a user receives a file, the machine learning may analyze the file in suggest a particular name for the file. The machine learning may determine, based on the particular name, that the file is already present on the computing device and indicate that the file is a duplicate and may be discarded.

Figure 4:
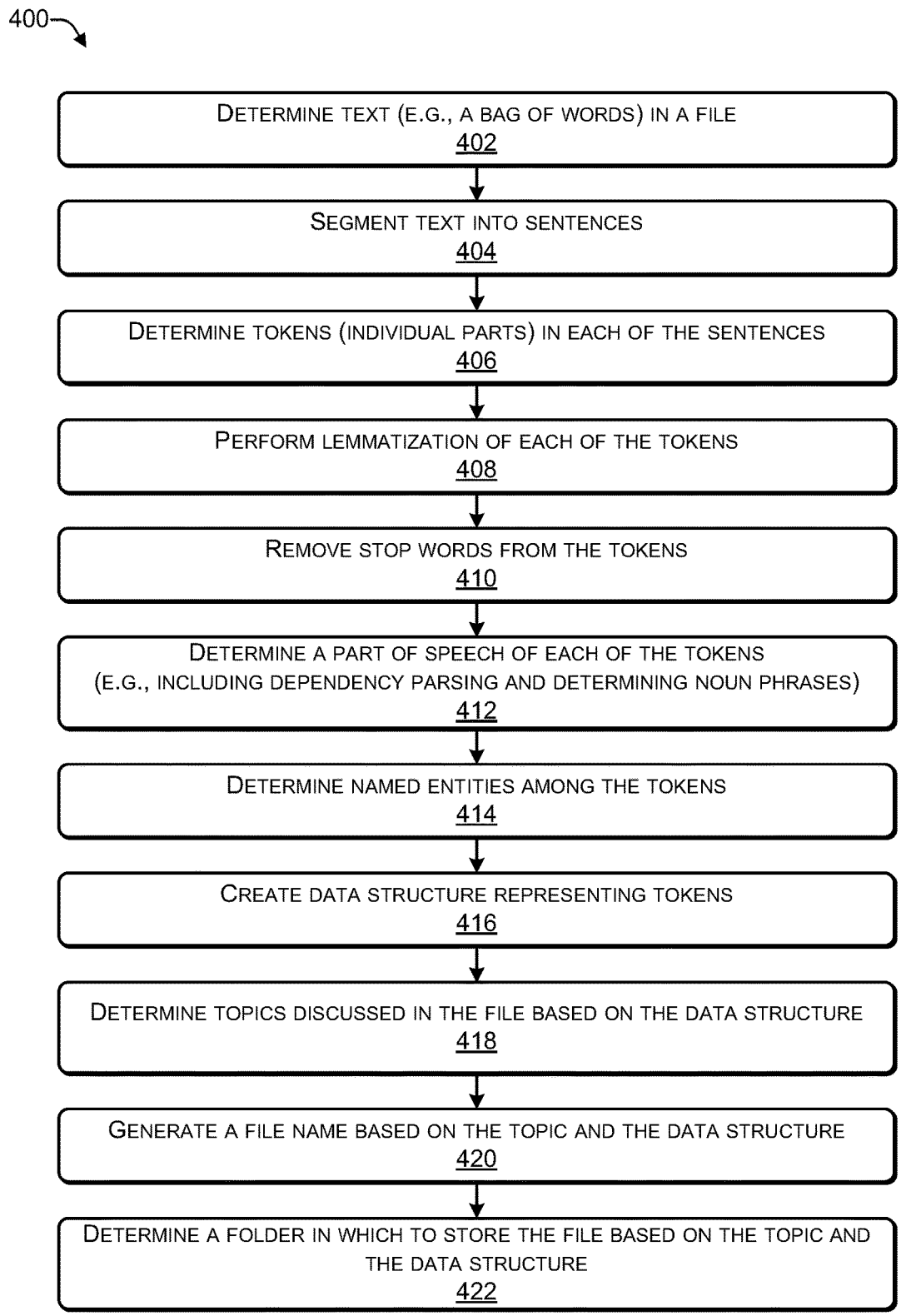
FIG. 4 is a flowchart of a process that includes determining text in a file, according to some embodiments.

FIG. 4 is a flowchart of a process 400 that includes determining text in a file, according to some embodiments. The process 400 may be performed by software components, such as, for example, the machine learning 112, the natural language processing 144, the save command 126, and the suggestions 128, of the computing device 102.

At 402, the process may determine text (e.g. in the form of a bag of words) included in a file. At 404, the process may segment the text into sentences. At 406, the process may determine tokens (individual parts) in each of the sentences. For example, in FIG. 1, the machine learning 112 and the natural language processing 144 may extract the text 135 from the file 124 to create the first bag of words 150. The machine learning 112 and the natural language processing 144 may parse the first bag of words 150, segment the text in the first bag of words 150 into sentences, and determine tokens (e.g., individual parts of speech) in each of the sentences.

At 408, the process may perform lemmatization of each of the tokens. At 410, the process may remove stop words from the tokens. At 412, the process may determine a part of speech at of each of the tokens, including performing dependency parsing and determining noun phrases. At 414, the process may determine named entities among the tokens. For example, in FIG. 1, the machine learning 112 and the natural language processing 144 may perform lemmatization of each of the tokens. Lemmatization groups different inflected forms of a particular word to enable the particular word to be analyzed as a single token. Thus, lemmatization links words with a similar or a same meaning to one particular word. Each lemmatized word may be analyzed to identify the part of speech (e.g., noun, pronoun, adjective, determiner, verb, adverb, preposition, conjunction, or interjection). Dependency parsing identifies the grammatical structure of a sentence by establishing relationships between "head" words and modifier words which modify a head word. A noun phrase (also referred to as a nominal) is a phrase that has a noun as its head or performs the same grammatical function as a noun. A named entity is a real-world object, such as a person (e.g., "John"), a location (e.g., "Austin, Tex.", an organization (e.g., "Dell®"), a product (e.g., "Inspiron", "Latitude"), or the like that may be denoted using a proper name.

At 416, the process may create a data structure representing the tokens. For example, in FIG. 1, the machine learning 112 may create a tree-based data structure to represent the tokens derived from the text 135 in the file 124.

At 418, the process may determine topics discussed in the file based on the data structure. At 420, the process may generate a filename based on the topic and the data structure. At 422, the process may determine a folder in which to store the file based on the topic and the data structure. For example, in FIG. 1, the machine learning 112 may determine the topics 148 discussed in the text 135 based on analyzing (e.g., lemmatization, tokenization, and the like) the first bag of words 150. The machine learning 112 may generate the filename 130 based on the topics 148 and the data structure.

Thus, a machine learning algorithm may use natural language processing to analyze the contents of a file to identify text to create a bag of words. The machine learning algorithm may perform an analysis of the bag of words using a variety of techniques, including, for example, segmenting the text into sentences, determining tokens in each sentence performing lemmatization of each of the tokens, removing stop words (e.g., "a", "the", and the like) from the tokens, determining parts of speech, performing dependency parsing, determining noun phrases, determining named entities, and creating a data structure representing the tokens. The machine learning algorithm may identify topics discussed in the file based on the analysis of the words. The topics may be used to create a filename for the file. The topics may be used to determine a folder in which to store the file. If a folder with a suitable name in which to store the file is not available, the machine learning may create a new folder with a suitable name (e.g., based on the topics) and store the file in the new folder.

Figure 5:
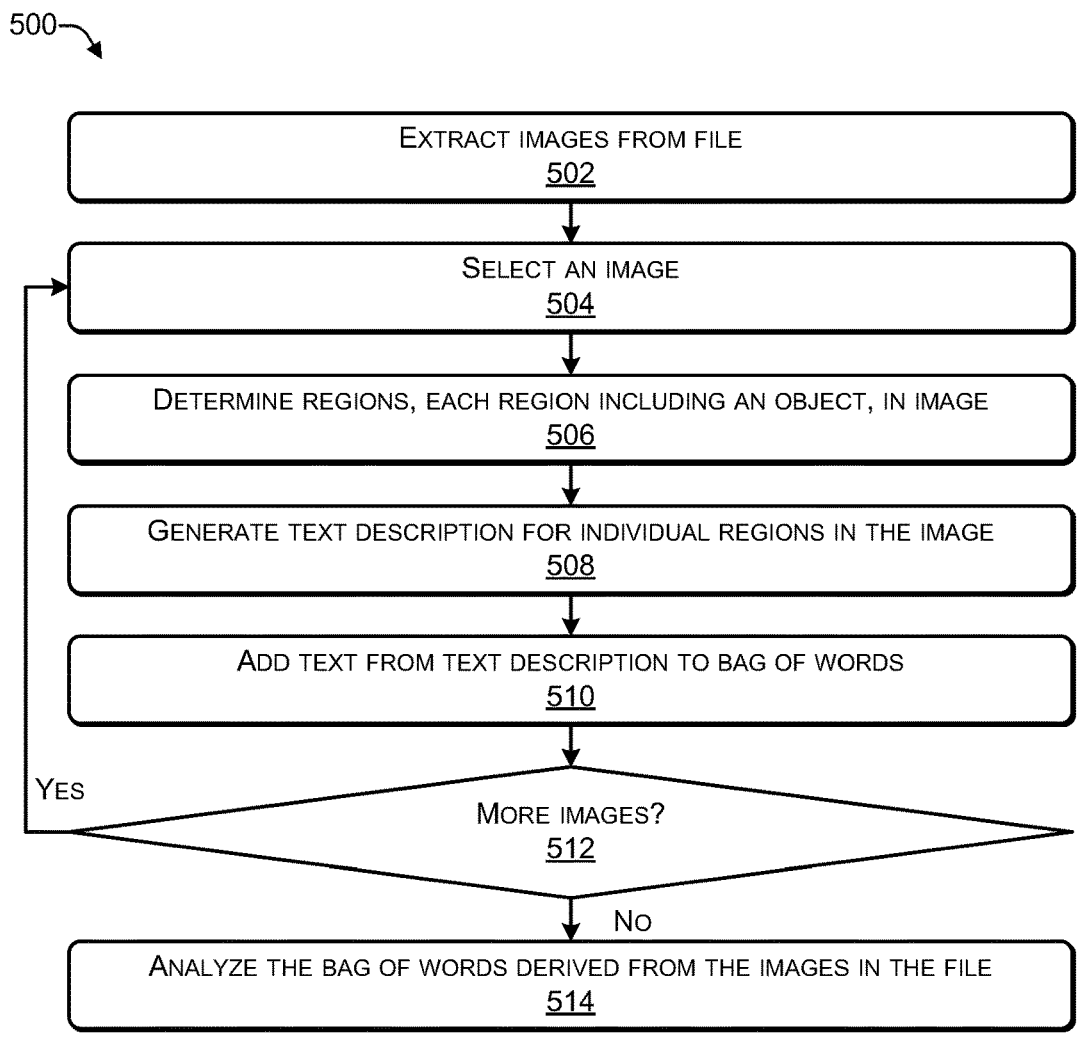
FIG. 5 is a flowchart of a process that includes extracting images from a file, according to some embodiments.

FIG. 5 is a flowchart of a process 500 that includes extracting images from a file, according to some embodiments. The process 500 may be performed by software components, such as, for example, the machine learning 112, the natural language processing 144, the save command 126, and the suggestions 128, of the computing device 102.

At 502, the process may extract zero or more images from a file. At 504, the process may select an image. At 506, the process may determine regions in the image, with each region including at least one object. At 508, the process may generate a text description for individual regions in the image. At 510, the process may add text from the text descriptions to a bag of words. At 512, the process may determine whether there are more images to be analyzed. If the process determines, at 512, that there are more images, then the process may proceed to 504, to select a next image. The process may repeat 504, 506, 508, 510, and 512 until each of the images extracted from the file have been analyzed. If the process determines, at 512, that there are no more images to be analyzed, then the process may proceed to 514 where the bag of words derived from the images in the file may be analyzed (e.g., as described in FIG. 3).

For example, in FIG. 2, the machine learning 112 may extract the images 136 from the file 124. The machine learning 112 may select one of the images 136 and identify regions in the selected image, with each region including one or more related objects. For example, an image of a meal at a restaurant may be subdivided into multiple regions, with a first region including a glass partially filled with a liquid, a second region including a plate with one or more food items, a third region including cutlery, a fourth region including a menu and so on. The machine learning 112 may create a text description for the one or more objects in each region, such as, for example, "drink" for the first region, "meal that includes a sandwich" for the second region, "cutlery" for the third region, "menu" for the fourth region, and so on. The text-based descriptions for each region may be added to a bag of words (e.g., the second bag of words 152) that is associated with the images 136. This process of identifying regions in each image and creating a text description for each region may be repeated for each of the images 136 extracted from the file 124. After each of the images 136 has been analyzed, the machine learning 112 may process the second bag of words 152 (and the first bag of words 150) using machine learning (LDA) 112 to determine the topics 148.

Figure 6:
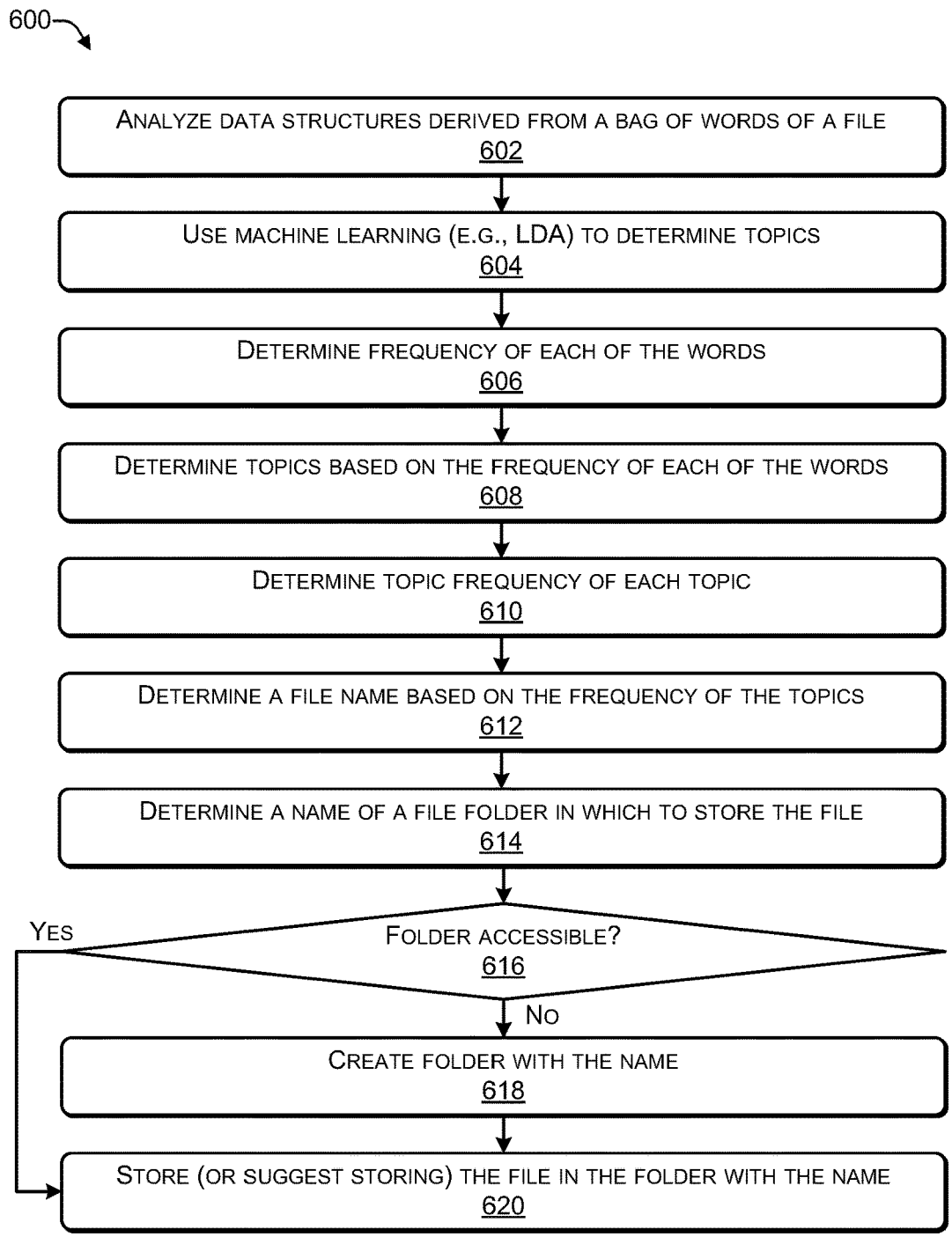
FIG. 6 is a flowchart of a process that includes analyzing a bag of words using Latent Dirichlet Allocation (LDA) to determine topics discussed and/or illustrated the file, according to some embodiments.

FIG. 6 is a flowchart of a process 600 that includes analyzing a bag of words using Latent Dirichlet Allocation (LDA) to determine topics discussed and/or illustrated the file, according to some embodiments. The process 600 may be performed by software components, such as, for example, the machine learning 112, the natural language processing 144, the save command 126, and the suggestions 128, of the computing device 102.

At 602, the process may analyze data structures derived from a bag of words associated with the file. At 604, the process may use machine learning (e.g. LDA) to determine, based on the data structures, one or more topics discussed in the file. For example, in FIG. 1, the machine learning 112 may analyze the data structures 154 derived from the bag of words 150, 152 to determine the topics 148 discussed in the file 124. The machine learning 112 may perform a similar analysis for each of the files 110 when processing the unorganized files 108 to create the organized files 114.

At 606, the process may determine a frequency of each of the words. At 608, the process may determine the topics based, at least in part, on the frequency of each of the words. At 610, the process may determine a topic frequency associated with each topic. For example, in FIG. 1, the machine learning 112 may determine a frequency associated with each of the topics 148. For example, in FIG. 2, the machine learning 112 may determine a frequency of each word in the bag of words 152 and determine the topics 148 based on the frequency of each of the words. The machine learning 112 may determine the frequency 206 associated with each of the topics 148. The machine learning 112 may order the topics 148 in descending order of frequency, with a first topic having a first frequency ahead of a second topic having a second frequency that is less than the first frequency.

At 612, the process may determine a filename based, at least in part, on the frequency of each topic. At 614, the process may determine of a file folder in which to store the file based, at least in part, on the frequency of each topic. At 616, the process may determine whether a folder with the name (e.g. determined at 614) is accessible. If the process determines at 616 that "no" the folder with the name is not accessible, then the process may create a folder with the name (e.g. determined at 614), at 618. If the process determines at 616 that "yes" the folder with the name is accessible, then the process may proceed to 620. At 620, the process may store (or suggest storing) the file in the folder with the name (e.g. determined at 614). For example, in FIG. 1, the machine learning 112 may determine the filename 130 based on the topics 148, including the frequency of each of the topics 148. To illustrate, the X (X>0) most frequent topics 148 may be used to create the filename 130. The machine learning 112 may determine, based on the topics 148 and the corresponding frequency associated with each of the topics, a particular folder name of a folder in which to save the file 124. If a folder of the folders 116 (or the subfolders 118) has the particular folder name, then the machine learning 112 may automatically store (or suggest storing) the file 124 in the folder 116 (or subfolder 118) having the particular folder name. If a folder of the folders 116 (or the subfolders 118) does not have the particular folder name, then the machine learning 112 may automatically create (or suggest creating) a folder with the particular folder name and automatically save (or suggest saving) the file 124 in the newly created folder. For example, the particular folder name may include at least one of the topics 148.

Figure 7:
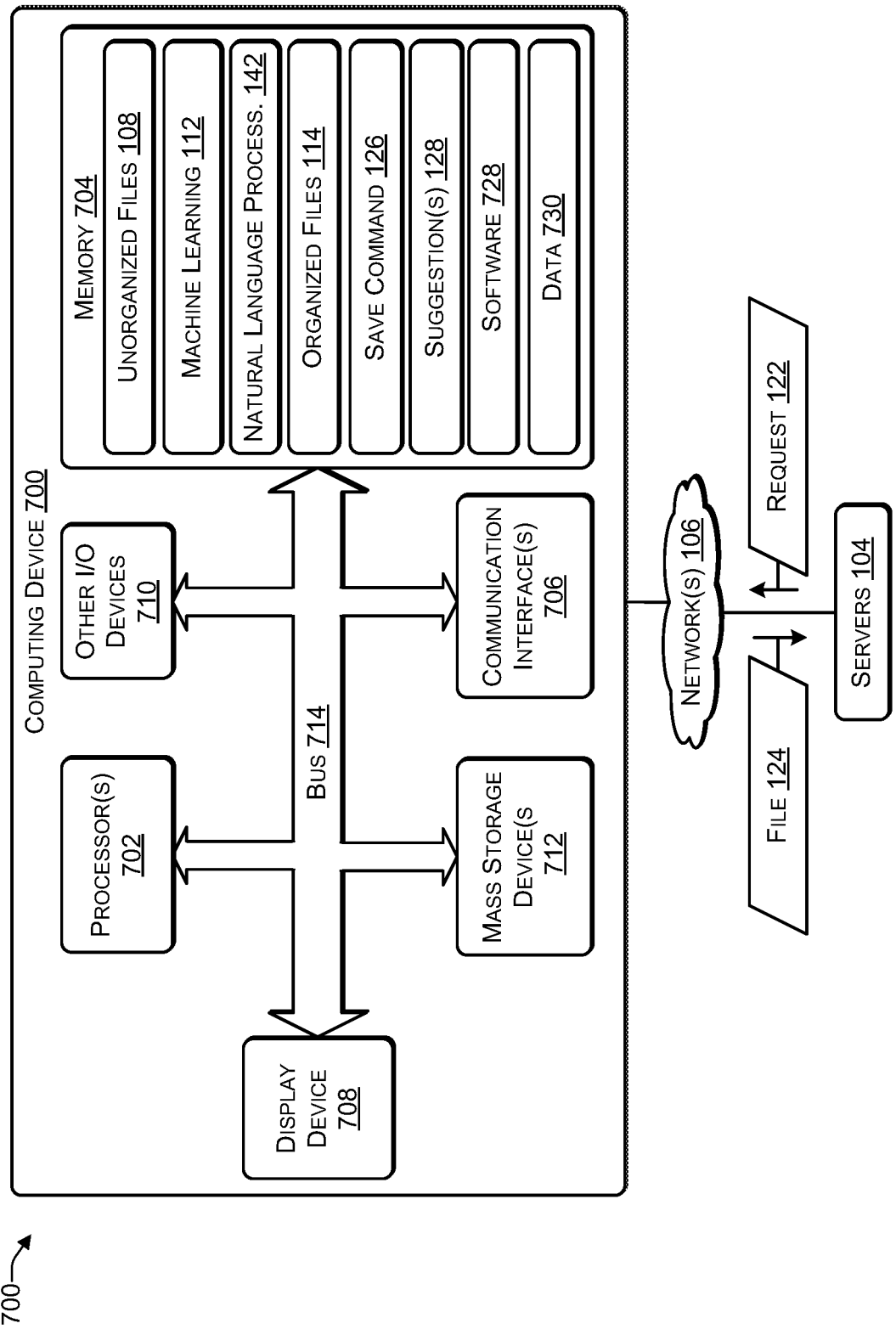
FIG. 7 illustrates an example configuration of a computing device that can be used to implement the systems and techniques described herein.

FIG. 7 illustrates an example configuration of a computing device 700 that can be used to implement the systems and techniques described herein, such as for example, the computing device 102 of FIG. 1.

The computing device 700 may include one or more processors 702 (e.g., including a CPU, a graphics processing unit (GPU), or the like), a memory 704, communication interfaces 706, a display device 708, other input/output (I/O) devices 710 (e.g., a keyboard, a trackball, and the like), and one or more mass storage devices 712 (e.g., disk drive, solid state disk drive, or the like), configured to communicate with each other, such as via one or more system buses 714 or other suitable connections. While a single system bus 714 is illustrated for ease of understanding, it should be understood that the system buses 714 may include multiple buses, such as a memory device bus, a storage device bus (e.g., serial ATA (SATA) and the like), data buses (e.g., universal serial bus (USB) and the like), video signal buses (e.g., Thunder-Bolt®, DVI, HDMI, and the like), power buses, etc.

The processors 702 are one or more hardware devices that may include a single processing unit or a number of processing units, all of which may include single or multiple computing units or multiple cores. The processors 702 may include a graphics processing unit (GPU) that is integrated with a CPU or the GPU may be a separate processor device from the CPU. The processors 702 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 702 may be configured to fetch and execute computer-readable instructions stored in the memory 704, mass storage devices 712, or other computer-readable media.

Memory 704 and mass storage devices 712 are examples of computer storage media (e.g., memory storage devices) for storing instructions that can be executed by the processors 702 to perform the various functions described herein. For example, memory 704 may include both volatile memory and non-volatile memory (e.g., RAM, ROM, or the like) devices. Further, mass storage devices 712 may include hard disk drives, solid-state drives, removable media, including external and removable drives, memory cards, flash memory, floppy disks, optical disks (e.g., CD, DVD), a storage array, a network attached storage, a storage area network, or the like. Both memory 704 and mass storage devices 712 may be collectively referred to as memory or computer storage media herein and may be any type of non-transitory media capable of storing computer-readable, processor-executable program instructions as computer program code that can be executed by the processors 702 as a particular machine configured for carrying out the operations and functions described in the implementations herein.

The computing device 700 may include one or more communication interfaces 706 for exchanging data via the network 136. The communication interfaces 706 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 706 can also provide communication with external storage, such as a storage array, network attached storage, storage area network, cloud storage, or the like.

The display device 708 may be used for displaying content (e.g., information and images) to users. Other I/O devices 710 may be devices that receive various inputs from a user and provide various outputs to the user, and may include a keyboard, a touchpad, a mouse, a printer, audio input/output devices, and so forth.

The computer storage media, such as memory 704 and mass storage devices 712, may be used to store software and data. For example, the computer storage media may be used to store the unorganized files 108, the machine learning 112, the NLP 142, the organized files 114, the save command 126, the suggestions 128, and other software 728 and data 730, as described herein.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   determining, by the one or more processors of a computing device, that a file is to be saved to a storage device of the computing device;
   performing, by the one or more processors, an analysis of contents of the file to create a bag of words, wherein performing the analysis comprises:
   segmenting text into one or more sentences;
   determining a plurality of tokens in each of the one or more sentences;
   performing lemmatization of each token of the plurality of tokens;
   removing stop words from the plurality of tokens to creating remaining tokens;
   determine a part of speech for each token in the remaining tokens;
   creating a data structure representing the remaining tokens in each of the one or more sentences; and
   determining the plurality of topics based at least in part on the data structure representing the remaining tokens in each of the one or more sentences;
   performing, by the one or more processors, a Latent Dirichlet Allocation of the bag of words;
   determining, by the one or more processors and based on the Latent Dirichlet Allocation, a plurality of topics included in the file;
   ordering, by the one or more processors, the plurality of topics in a descending order of a frequency of individual topics in the plurality of topics to create an ordered set of topics;
   generating, by the one or more processors, a particular name of the file based on the ordered set of topics; and
   automatically saving, by the one or more processors, the file with the particular name.

2. The method of claim 1, further comprising:
   determining a folder name of a folder in which to store the file based on the ordered set of topics.

3. The method of claim 2, further comprising:
   determining that an existing folder among a set of accessible folders has the folder name; and
   saving the file in the existing folder.

4. The method of claim 2, further comprising:
   determining that a set of accessible folders does not include a particular folder with the folder name;
   creating a new folder with the folder name; and
   saving the file in the new folder.

5. The method of claim 1, wherein performing the analysis of the contents of the file to create the bag of words comprises:
   determining text included in the file;
   performing a first analysis of the text to create a first bag of words;
   determining one or more images in the file;
   performing a second analysis of the one or more images to create a second bag of words; and
   combining the first bag of words and the second bag of words to create the bag of words.

6. The method of claim 5, wherein performing the second analysis comprises:
   determining one or more regions in individual images of the one or more images, wherein individual regions of the one or more regions includes at least one object;

determining a text-based description to describe the at least one object in individual regions;
storing the text-based description of individual regions in the individual images in the second bag of words.

7. A computing device comprising:
one or more processors; and
one or more non-transitory computer readable media to store instructions executable by the one or more processors to perform operations comprising:
  determining that a file is to be saved to the computing device;
  performing an analysis of contents of the file to create a bag of words, wherein performing the analysis comprises:
    segmenting text into one or more sentences;
    determining a plurality of tokens in each of the one or more sentences;
    performing lemmatization of each token of the plurality of tokens;
    removing stop words from the plurality of tokens to creating remaining tokens;
    determine a part of speech for each token in the remaining tokens;
    creating a data structure representing the remaining tokens in each of the one or more sentences; and
    determining the plurality of topics based at least in part on the data structure representing the remaining tokens in each of the one or more sentences;
  performing a Latent Dirichlet Allocation of the bag of words;
  determining, based on the Latent Dirichlet Allocation, a plurality of topics included in the file;
  ordering the plurality of topics in a descending order of a frequency of individual topics in the plurality of topics to create an ordered set of topics;
  generating a particular name of the file based on the ordered set of topics; and
  automatically saving the file with the particular name.

8. The computing device of claim 7, wherein the operations comprise:
determining a folder name of a folder in which to store the file based on the ordered set of topics;
based on determining that an existing folder among a set of accessible folders has the folder name, saving the file in the existing folder; and
based on determining that the set of accessible folders does not include a particular folder with the folder name:
  creating a new folder with the folder name; and
  saving the file in the new folder.

9. The computing device of claim 7, further comprising:
saving the file with the particular name in a particular folder;
wherein:
the particular folder includes one or more additional files; and
individual files of the one or more additional files include at least one topic of the plurality of topics included in the file.

10. The computing device of claim 7, wherein performing the analysis of the contents of the file to create the bag of words comprises:
determining text included in the file;
performing a first analysis of the text to create a first bag of words;
determining one or more images in the file;
performing a second analysis of the one or more images to create a second bag of words; and
combining the first bag of words and the second bag of words to create the bag of words.

11. The computing device of claim 10, wherein performing the second analysis comprises:
determining one or more regions in individual images of the one or more images, wherein individual regions of the one or more regions includes at least one object;
determining a text-based description to describe the at least one object in individual regions; and
storing the text-based description of individual regions in the individual images in the second bag of words.

12. One or more non-transitory computer readable media storing executable by one or more processors to perform operations comprising:
determining that a file is to be saved to the computing device;
performing an analysis of contents of the file to create a bag of words, wherein performing the analysis comprises:
  segmenting text into one or more sentences;
  determining a plurality of tokens in each of the one or more sentences;
  performing lemmatization of each token of the plurality of tokens;
  removing stop words from the plurality of tokens to creating remaining tokens;
  determine a part of speech for each token in the remaining tokens;
  creating a data structure representing the remaining tokens in each of the one or more sentences; and
  determining the plurality of topics based at least in part on the data structure representing the remaining tokens in each of the one or more sentences;
performing a Latent Dirichlet Allocation of the bag of words;
determining, based on the Latent Dirichlet Allocation, a plurality of topics included in the file;
ordering the plurality of topics in a descending order of a frequency of individual topics in the plurality of topics to create an ordered set of topics;
generating a particular name of the file based on the ordered set of topics; and
automatically saving the file with the particular name.

13. The one or more non-transitory computer readable media of claim 12, wherein the operations comprise:
determining a folder name of a folder in which to store the file based on the ordered set of topics;
based on determining that an existing folder among a set of accessible folders has the folder name, saving the file in the existing folder; and
based on determining that the set of accessible folders does not include a particular folder with the folder name:
  creating a new folder with the folder name; and
  saving the file in the new folder.

14. The one or more non-transitory computer readable media of claim 12, further comprising:
saving the file with the particular name in a particular folder that includes one or more additional files, wherein, each file of the one or more additional files includes at least one topic of the plurality of topics.

15. The one or more non-transitory computer readable media of claim 12, further comprising:

saving the file with the particular name in a particular folder having a particular folder name, wherein the particular folder name includes at least one topic of the plurality of topics.

16. The one or more non-transitory computer readable media of claim 12, wherein performing the analysis of the contents of the file to create the bag of words comprises:
    determining text included in the file;
    performing a first analysis of the text to create a first bag of words;
    determining one or more images in the file;
    performing a second analysis of the one or more images to create a second bag of words; and
    combining the first bag of words and the second bag of words to create the bag of words.

17. The one or more non-transitory computer readable media of claim 16, wherein performing the second analysis comprises:
    determining one or more regions in individual images of the one or more images, wherein individual regions of the one or more regions includes at least one object;
    determining a text-based description to describe the at least one object in individual regions; and
    storing the text-based description of individual regions in the individual images in the second bag of words.

* * * * *